Feb. 10, 1931.  W. E. SIGNOR  1,792,250
SIGNAL
Filed Nov. 22, 1926   2 Sheets-Sheet 1

Inventor
William E. Signor;

By Clarence A. O'Brien
Attorney

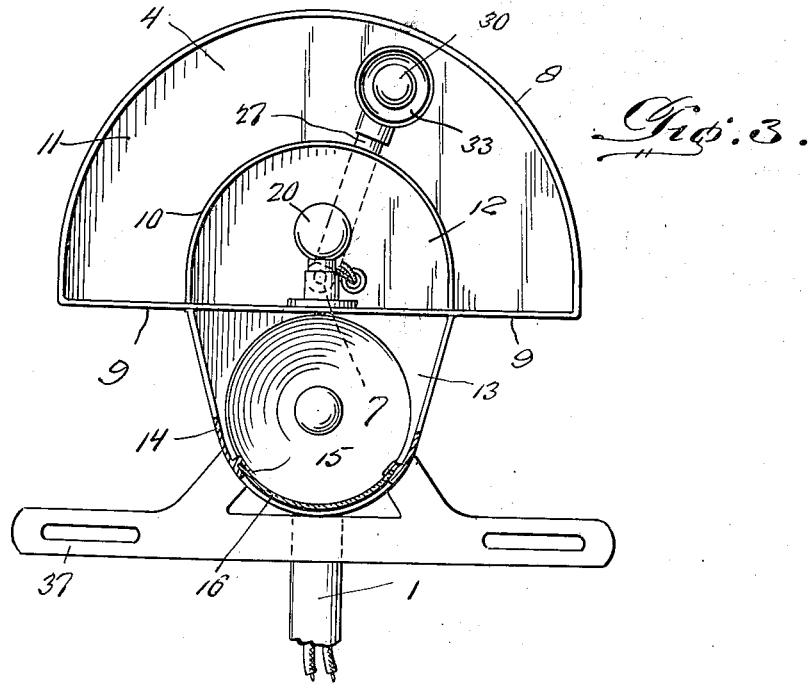
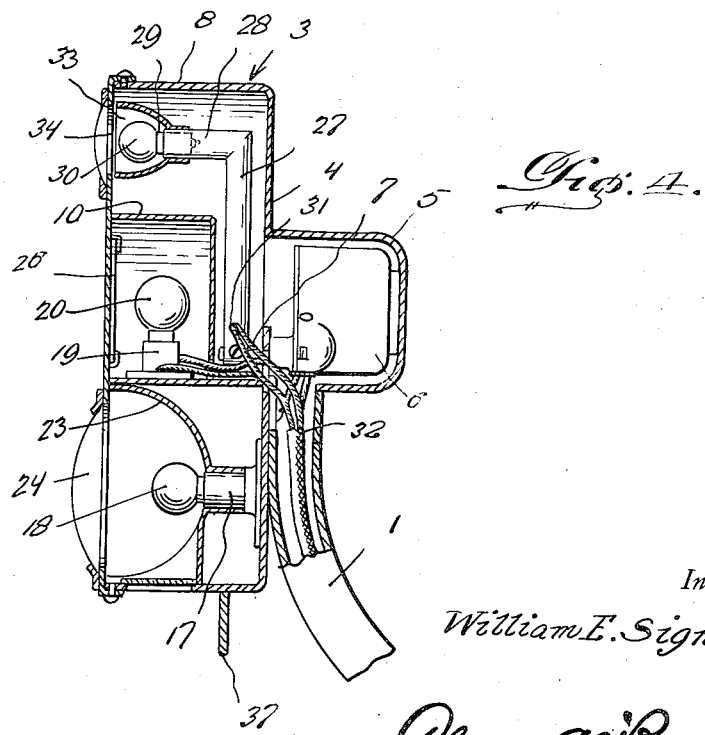

Patented Feb. 10, 1931

1,792,250

UNITED STATES PATENT OFFICE

WILLIAM E. SIGNOR, OF SOUTH CORTLAND, NEW YORK

SIGNAL

Application filed November 22, 1926. Serial No. 150,068.

This invention relates to signals and more particularly to a signal for attachment to motor vehicles for signalling the stopping of a vehicle equipped therewith, in such a manner that it will readily attract attention.

It is an object of this invention to provide an improved signal device for motor vehicles and the like, which is adapted by the special cooperation of parts to produce a signal of a new and novel character adapted to readily attract the attention to its operation, and which is simple in construction, economical in operation, and may be manufactured at a minimum cost.
This invention further comprehends the provision of a signal mechanism wherein a suitable support or casing is provided with a series of openings alined in any suitable and desired manner which may or may not be provided with projecting lenses at one side of which is arranged a movable illuminating element having means for moving the element to successively project laterally through each opening in the support or casing, so as to produce a novel optical illusion of a highly attractive character for signalling purposes.

The invention more specifically comprehends the provision of a casing provided with a plurality of adjacently arranged openings in which are mounted suitable lenses for projecting light outwardly from the casing, and which contains a movable arm member carrying a suitable illuminating device and adapted for oscillating motion within the casing to successively project the light through each of said series of openings therein, and the lenses mounted in said openings for signalling in a highly novel manner when attached to a motor vehicle the intended operation of the vehicle.

The invention comprehends numerous other objects residing in the specific construction and arrangement of the parts for carrying out the combination above set forth, all of which are more particularly pointed out in the following detailed description and claims directed to the preferred form of construction, it being understood however, that various changes in the size, shape and arrangement of the parts may be made without departing from the spirit or scope of the invention as herein set forth.

In the drawings forming part of this application:—

Fig. 3 is a vertical transverse section thru the signal shown in Fig. 1, illustrating the detail structure of the interior of the casing.

Fig. 4 is a vertical sectional view taken on the line 4—4 of Fig. 1.

Figure 1:
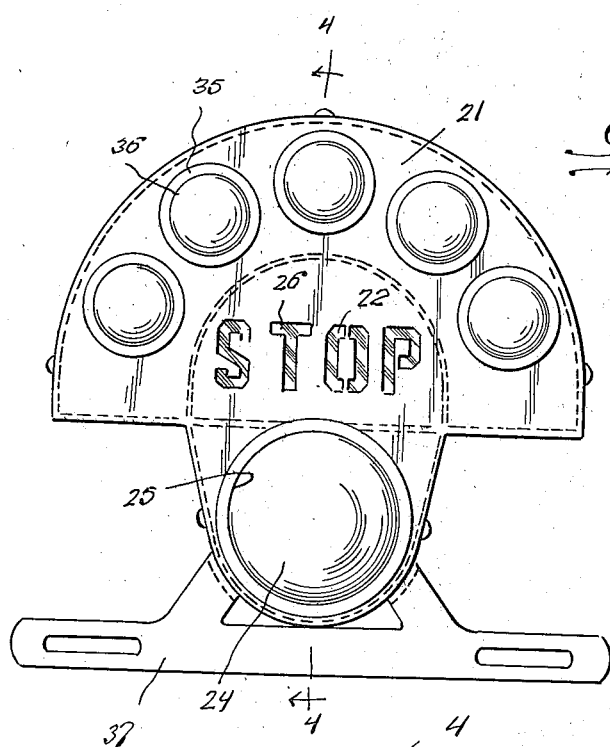
Figure 1 is a rear elevational view of the improved signal.
Figure 2:
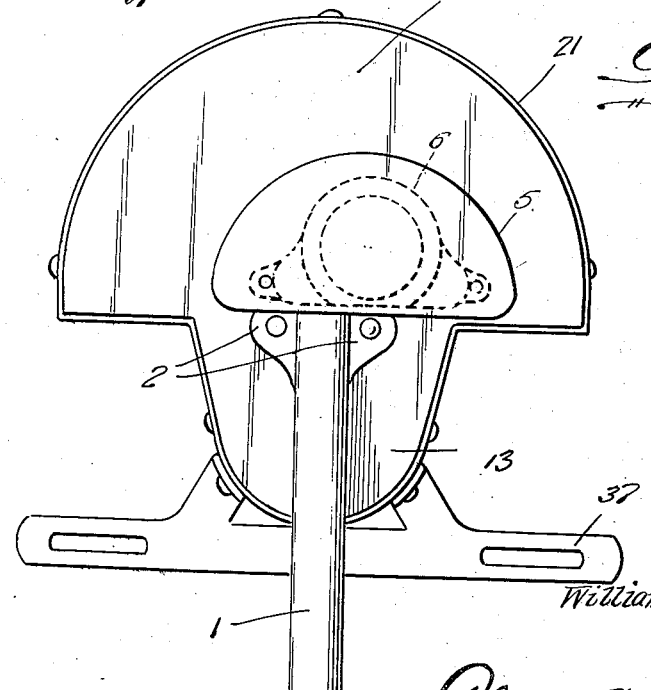
Fig. 2 is an elevation view of the opposite side thereof.

My signal is primarily intended for use on a motor vehicle with the light thereof preferably directed rearwardly in the conventional fashion and with the signal casing supported in any suitable manner upon a rear vehicle portion.

Said signal may comprise an open faced main casing member 3 having a sector-like flat back wall 4 which may be provided with an offset or rearwardly projecting housing portion 5 adapted to receive the driving motor 6. This motor may be of any suitable type of electric motor including an armature equipt with reducing mechanism (not shown) adapted to impart an oscillating movement to the drive shaft 7, such means being well known in this art and disclosed in the United States Patent No. 1,197,862 of September 12, 1916, also in No. 1,234,664 of July 24, 1917, and the like.

The radially outermost portion of said casing 3 is enclosed by a narrow peripheral outer wall 8 which as shown in Fig. 4 may be integrally adjoined in a lateral relation to the arcuate marginal portion of the back wall 4. The respective extremities of said outer wall 8 terminate in the casing bottom walls 9 which extend laterally with respect to the rear wall 4 and directed radially inward toward the arcuate center thereof. The interior partition wall 10 has an arcuate wall disposed in a substantially concentric relation to the outer wall 8 and also has a complementary wall normal thereto that is kept spaced with respect to said flat rear wall 4; said partition divides my casing into two compartments, namely the annularly or arcuate shaped primary chamber 11 and an inner or secondary chamber 12 that is circumscribed by the chamber 11. While the drawings disclose an arcuate chamber 11 of full semi-circular shape, it will be understood that this particular disposition is not essential since the oppositely disposed bottom walls 9 may readily be given a lesser spread and thus bring the cover of my casing contour into any desired sector-like shape.

The operative or front face of my casing is provided with a flat cover 21 adapted to removably close or complete the open annular side of the primary chamber 11 and also the corresponding side of the inset chamber 12 in compartmental fashion. Below said bottom wall 9, the rear wall 4 may be provided with an extension 13, from the edge portion of which extends a laterally disposed wall 14 having an opening in the bottom thereof at 15 adapted to receive the transparent plate 16. Said enclosure serves to form a tail light housing in which is mounted the socket 17 carrying the tail light bulb 18 which may be provided with a suitable reflector 23 as made to project through the lens 24 and also the bottom transparency 16. The last named bulb is intended to be kept lighted at night in the customary manner but it is pointed out that the described unitary embodiment of the tail light housing is not an essential feature of my invention since the compartments 11 and 12 may readily be utilized without this adjunct.

Referring further to the cover member 21, that portion which covers the secondary compartment is provided with a perforated legend "Stop" behind which the glass plate 26 is mounted in the conventional manner. The chamber 12 is further equipt with an independent socket 19 and a bulb 20 adapted to periodically illuminate said inscription. In the present invention, the effectiveness of such steady or maintained illumination is materially heightened by cooperative association with an attractive flash light effect comprising a plurality of spaced lenses behind the path of which another light of the wig-wag type is made to move in successive order for the purpose of attracting attention to said "Stop" legend, when lighted.

It is emphasized that said centrally disposed secondary compartment is cooperatively associated with respect to the circumscribing primary compartment in that the "Stop" legend is made especially serviceable during day-time driving at which time the flash-like display on part of my spaced lenses is likely to be less pronounced; on the other hand, during night driving the visability of the respective signal types become reversed since the "Stop" legend can then be less readily distinguished particularly so when used in conjunction with a closely adjacent conventional tail light, but at such times, the swinging flash light effect adequately attracts the attention of any following rearward driver even should my oscillatory arm be set in motion at an unusually long distance ahead of such trailing car.

The wig-wag lever arm 27 may be removably secured to the motor drive shaft 7 which is coaxially disposed with the approximate center of the arcuate casing wall 8. Said arm is radially disposed and adapted to swing between the rear wall 4 and the spaced partition wall 10, the outer or free end of said arm being equipt with a lateral extension 28 carrying a socket 29 for the electric bulb 30. The wiring circuit for the bulb 30 is shown as strung through the arm 27 which may be made of tubular form and which wires may pass outwardly through the tube opening 31 adjacent to the drive shaft, so that these wire leads may be conveniently connected to a feed cable 32 extending to the conduit member 1 for connection to a suitable source of electric current. It will be observed that the stop light 20 is also connected to this same cable.

A parabolic reflector 33 is carried by the free end of the arm bulb 30 and when lighted, the major portion of its rays will be successively directed outwardly through said plurality of spaced lenses when the arm path falls into registry therewith. To this end, that portion of the cover 21 which overlies the annular chamber 11 is provided with a plurality of lens openings such as 34 arranged in closely spaced arcuate relation in the manner indicated in Fig. 1.

The open or mouth end of said reflector is preferably set flush with the inner face of the cover 21 in order to provide for substantial light seal with respect to any one of said lens openings.

Suitable ring members 35 are secured to the cover 21 and are adapted to retain lenses 36 over each of the openings 34. The position of the reflector 33 and the lamp 30 carried by arm 27 are such that they will register with each of the openings 34 in the movement of the arm within the annular chamber 11 by the oscillating motion of the drive shaft 7 through operation of motor 6.

The motor 6 as above set forth may be of any desired type either electrically operated, pneumatically operated, or of any other desired character known in the art which will operate the shaft 7 to produce an oscillating motion, in order to move the arm 27 back and forth within the chamber 11 and cause the lateral extension 28 on the arm to successively register with each of the openings 34 in order that the light projected from lamp 30 will be projected through the lenses 36 successively, from one side of the casing to the other, and back again.

With this construction, it is to be understood that suitable means may be provided for controlling the operation of the device in order that the lamps 20 and 30 may be illuminated at the same time for illuminating the stop signal and providing for the projection of light thru the lenses 36 to attract attention to the stop signal display. It is furthermore to be understood, that the motor 6 will be operated simultaneously with the energization of the lamps 20 and 30 in order that the arm will oscillate so long as said lamps are energized. These lamps and the motor may be suitably electrically connected with a switch mechanism operated by the brake pedal or clutch pedal of a motor vehicle in any manner well known in the art, by which the depression of either pedal will energize the circuit to the lamp and the controlling mechanism of the motor to produce the above results.

It is to be further understood that the oscillating arm 27 may be used for successively projecting the light through the lenses 36 in the manner as above described for giving the stop signal in a construction which does not employ the use of the stop lamp 20 and the signal illuminated thereby.

My device is preferably supported by a suitable bracket member 37 as mounted on the laterally extending casing walls 14 and this may also serve as a license tag bracket so that the tail light 18 may function as the usual tail light of a motor vehicle, and as required by the law, illuminates the license tag secured to the bracket 37 thru the plate 16 in addition to illuminating the lens 24.

From the above description, it should therefore be clearly understood that a construction has been provided in which a plurality of openings are formed in adjacent predetermined alined relation in such a manner that a movable light member mounted within the casing will register successively with each opening in its movement and projecting light therethrough for successively illuminating each of the plurality of lenses mounted in the series of openings, in order to provide a highly attractive signal device adapted for use on motor vehicles, and which may be also applied to other uses where a device of this character may be applicable.

It is to be further understood that this invention simplifies the construction of devices using the illumination of a plurality of lenses successively, by providing for this result with a single light as distinguished from structures heretofore used in the art, requiring a separate illuminating means for each lens.

Having thus described my invention, what I claim as new is:—

In a wig-wag signal or the like, comprising a casing having a sector-shaped rear wall closure with normally disposed side walls extending from the margin thereof and affording an open front casing face, a partition disposed within and adapted to divide said casing into an open secondary chamber and also into an open primary chamber disposed concentric with the first named chamber and extending therebehind to provide for a spacing between said rear wall and the secondary chamber, a removable cover means serving to close the respective open faces of said compartmental chambers, said cover being provided with a series of spaced apertures disposed in the primary compartment cover portion and also provided with a perforated inscription through the secondary compartmental cover portion, an electric bulb disposed to intermittently light up said inscription, a lens for each of said spaced cover apertures, a single movable electric bulb disposed to oscillate within said primary chamber and directly behind said lenses, a lever arm disposed to swing within said extended spacing and adapted to reversably carry said single bulb across the course of said lenses in regular intervals and produce a flash light effect therethrough, and actuating means of the electro-magnetic type serving to reciprocate said arm and cause a dwell period toward each end of arm travel, said actuating means being energized simultaneously with the lighting of both compartmental bulbs.

In testimony whereof I affix my signature.

WILLIAM E. SIGNOR.